(12) United States Patent
Loontjens et al.

(10) Patent No.: US 6,683,151 B1
(45) Date of Patent: Jan. 27, 2004

(54) SUPRAMOLECULAR COMPOUND

(75) Inventors: Jacobus A. Loontjens, Meerssen (NL); Johan E. G. A. Jansen, Geleen (NL); Bartholomeus J. M. Plum, Meerssen (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/511,984

(22) Filed: Feb. 24, 2000

(30) Foreign Application Priority Data

Feb. 25, 1999 (NL) ............................................ 1011386

(51) Int. Cl.$^7$ ....................... C09D 175/00; C09D 11/00; C08L 75/00; C08G 18/00; C08G 18/30; C08G 18/28; C08G 18/40; C07C 275/00; C07D 251/54

(52) U.S. Cl. .................. 528/44; 106/18.32; 106/18.33; 106/31.43; 106/31.45; 106/31.46; 106/31.47; 106/31.75; 106/31.76; 106/31.77; 428/373; 428/375; 428/378; 428/392; 385/115; 385/123; 544/196; 544/200; 544/205; 544/206; 544/320; 564/22; 564/32; 564/38; 564/103; 564/123; 546/244; 560/25; 560/26; 560/115; 560/157; 560/158; 528/60; 528/61; 528/64; 528/68; 528/76; 528/80; 528/84; 528/85

(58) Field of Search ............................. 528/60, 61, 64, 528/44, 68, 76, 80, 84, 85; 560/25, 26, 115, 157, 158; 564/32, 22, 38, 123, 103; 544/196, 200, 205, 206, 320; 546/244; 106/18.32, 18.33, 31.43, 31.45, 31.46, 31.47, 31.75, 31.76, 31.77; 428/373, 375, 378, 392; 385/115, 123

(56) References Cited

U.S. PATENT DOCUMENTS

| 4,093,759 A | 6/1978 | Otsuki et al. ................ 428/35 |
| 4,136,092 A | 1/1979 | Jackle et al. .................. 528/60 |
| 5,723,563 A | * 3/1998 | Lawrey et al. ............... 528/61 |

FOREIGN PATENT DOCUMENTS

| EP | 25 992 | 9/1983 |
| WO | 98/14504 | * 4/1998 |

OTHER PUBLICATIONS

Chemical Abstracts, vol. 80, No. 20, May 20, 1974, English abstract of JP 04 829398, filed Aug. 28, 1968.

Chemical Abstracts, vol. 97, No. 10, Sep. 1982, Veselovskii et al., "Adhesive Composition", Inst. of the Chemistry of High Molecular Weight Compounds, Mar. 5, 1979.

* cited by examiner

Primary Examiner—Rabon Sergent
(74) Attorney, Agent, or Firm—Pillsbury Winthrop LLP

(57) ABSTRACT

The invention relates to a compound comprising a reaction product of (A) an isocyanate functional compound of which at least 40 wt. %, relative to the total amount of (A), has a molecular weight of at least about 500, and (B) a nitrogen-containing compound capable of reacting with said isocyanate functional compound (A). The reaction product has a molecular weight of less then about 20,000 and comprises an effective amount of groups that are able to form reversible intermolecular physical interactions such that a resulting compound shows polymeric mechanical properties at a temperature below a transition temperature. The nitrogen-containing compound is, for instance, melamine, urea, acetoguanamine, benzoguanamine, cyanamide, dicyanamide, thiourea, isocytosine, pyrimidone or aminopyridine. The supramolecular compound comprising a suitable amount of the reaction products exhibits a relatively high elongation at break.

26 Claims, No Drawings

SUPRAMOLECULAR COMPOUND

The invention relates to supramolecular compounds containing reaction products that form interactions between one another of which the strongest interactions are reversible physical interactions, in particular hydrogen bonds. These interactions are further called reversible intermolecular physical interactions.

Such supramolecular compounds, for instance polymers, are described in Macromolecules (1995,28,782–783) by Lange and Meijer. These polymers can be obtained by radical polymerization of, for instance, styrene and a maleimide monomer. The resulting copolymer is mixed with melamine. A disadvantage of mixtures thus obtained is that they are very brittle and have inadequate mechanical properties In general, "supramolecular chemistry" is understood to be the chemistry of non-covalent, oriented, multiple (at least two), cooperative interactions. For instance, a "supramolecular polymer" is an organic compound which essentially obtains its polymeric properties, for instance with respect to its theological behaviour, through a combination of covalent bonds and specific secondary interactions with high physical bond strengths that contribute substantially to the properties of the resulting material.

The aim of the invention is to provide "supramolecular" compounds that contain reaction products that at least partially form physical interactions, such as hydrogen bonds, between one another; said supramolecular compounds exhibiting a relatively high elongation at break.

The compound according to the invention is the reaction product of an isocyanate, a hydroxy functional, an acid functional or an amino functional compound and a nitrogen-containing compound capable of reacting with an isocyanate.

The compound according to the invention comprises reaction products of (A) an isocyanate functional compound of which at least 40 wt. %, relative to the total amount of (A), has a molecular weight of at least about 500, and (B) a nitrogen-containing compound capable of reacting with said isocyanate functional compound (A).

The reaction product of the present invention has a molecular weight of less than about 20,000. The reaction product comprises an effective amount of groups that are able to form reversible intermolecular physical interactions such that a resulting compound comprising the reaction product shows polymeric mechanical properties at a temperature below a transition temperature. The compound of the present invention has an elongation at break at 25° C. of at least about 2%.

For the sake of clear definition, the terms "supramolecular compound", "compound" and "composition" will be interchangeably used to define a compound that contains the reaction product forming reversible physical bonds between the molecules, in other words, to define the association of the molecules. The term "reaction product" and "molecules" will be interchangeably used throughout the description for defining the structural units of which the supramolecular compound is built up.

Preferably, the isocyanate functional compound (A) is formed by the reaction of (i) an isocyanate with (ii) a hydroxy functional, an acid functional or an amino functional compound of which at least 40 wt. %, relative to the total amount of (ii) is having a molecular weight of at least about 450.

The isocyanate (i) and isocyanate functional compound (A) preferably are at least bifunctional.

The isocyanate functional compound can comprise an isocyanate functional group (—NCO) and/or a compound, which is the reaction product of an isocyanate group with a blocking group, further called a blocked isocyanate group.

In another embodiment of the present invention the product is the reaction product of (A) an isocyanate functional compound having a functionality of at least two and of which at least 40 wt. % is having a molecular weight of at least about 500, and (B) a nitrogen-containing compound that is capable of reacting with compound (A) and that comprises additionally to said nitrogen n amino-groups, wherein n is at least 1. Preferably, the molar ratio is chosen as such that only one amino-group per compound (B) reacts with one isocyanate-group of (A), irrespectively of the number of amino groups present in (B).

From DE-A-2364157 it is known to first react a diisocyanate with an hydroxy functional compound to form a diisocyanate functional compound and to further react one mole of said diisocyanate functional compound with one mole of a melamine derivative such that melamine acts as a polyamine crosslinking compound. In other words, a polymer is formed.

From DE-A-2625399 it is further known to crosslink a diisocyanate functional polyether compound with a melamine derivative as diamine by using substantially equal molar amounts of diisocyanate and diamine.

From WO 96/35135 an optical fiber surrounded with a reversibly cross-linked plastic covering material is known. Further, a method is known of manufacturing said fiber by depositing thereon said plastic material at a temperature higher than 70° C. and by cross-linking said material when cooling to a temperature close to ambient temperature. The plastic material described in WO 96/35135 consists of reversible chemical crosslinks and is, in particular, produced by the reaction of a non-linear polyimide reactant having an imide functionality of at least three and a polyamine comprising at least two primary or secondary amino functionalities. The disadvantage of the use of a reversible chemical crosslinked material as described in WO 96/35135 and in WO 95/00576 cited therein, is that the de-crosslinking step does not occur to an extent which is sufficient in terms of achieving, from thermodynamic point of view, the required flow.

Further, from WO 98/14504, supramolecular compounds are known containing hydrogen-bridge-forming monomer units that in pairs form at least 4 hydrogen bonds with one another. For instance, 1 mol of a low Mw diisocyanate functional compound reacts with 2 mols of a substituted isocytosine compound to form said supramolecular compound. The disadvantage of the supramolecular compounds disclosed in WO 98/14504 is that they are too brittle.

The compound (or the mixture of compounds) according to the invention derive their properties in part from the multiple hydrogen bonds that are formed between the various reaction products. These reaction products consist of a hydroxy, amino or acid functional compound (ii) that is successively converted with, for instance, a diisocyanate (i) to form a diisocyanate functional compound (A). Said compound (A) then reacts with a nitrogen-containing compound (B). The hydroxy, amino or acid functional compound (ii) preferably is at least bifunctional and at least 40 wt. % (relatively to the total amount of (ii)) of said hydroxy, amino or acid functional compound has a molecular weight of at least about 450. Surprisingly, the compounds obtained have a relatively high elongation at break at room temperature (25° C.), even though their molecular weight is still relatively low.

The compound of the invention will be thermally formed or hardened, in other words, the compound will be formed by association of a suitable amount of reaction products when lowering the temperature. In particular, by lowering the temperature below a certain defined transition temperature.

The transition temperature can be defined as the temperature at which a substantial amount of intermolecular physical interactions are formed between the various reaction products. The physical interactions, formed between the various molecules, can be reversibly and at least partially broken, in particular by increasing the temperature to a temperature above a certain transition temperature The transition temperature can further be defined as the temperature below which the compound shows polymeric mechanical properties similar to those of thermoplastic materials at such temperatures. In particular, the temperature at which the reaction product shows a tensile strength of at least 0.05 MPa, preferably at least 0.1 MPa. Another way to define the transition temperature is the temperature above which one or several intermolecular physical bonds deteriorate. Finally, at a certain temperature above the transition temperature, a liquid is obtained. Generally, the transition temperature lies in the range of about 5° C. to about 100° C. Preferably, the transition temperature lies between about 10° C. and about 80° C., more preferably, between about 15° C. and about 60° C., particularly preferred, between about 20° C. and about 50° C., and most preferred, between about 23° C. and about 45° C.

Examples of suitable isocyanates (i) according to the present invention preferably are isocyanates with a functionality of at least two such as, for instance, as examples of diisocyanates, 1,4-diisocyanato-4-methyl-pentane, 1,5-diisocyanato-5-methylhexane, 3(4)-isocyanatomethyl-1-methylcyclohexyl isocyanate, 1,6-diisocyanato-6-methyl-heptane, 1,5-diisocyanato-2,2,5-trimethylhexane and 1,7-diisocyanato-3,7-dimethyloctane, or 1-isocyanato-1-methyl-4-(4-isocyanatobut-2-yl)-cyclohexene, 1-isocyanato-1,2,2-trimethyl-3-(2-isocyanato-ethyl)-cyclopentane, 1-isocyanato-1,4-dimethyl-4-isocyanatomethyl-cyclohexane, 1-isocyanato-1,3-dimethyl-3-isocyanatomethyl-cyclohexane, 1-isocyanatol-n-butyl-3-(4-isocyanatobut-1-yl)-cyclopentane and 1-isocyanato-1,2-dimethyl-3-ethyl-3-isocyanatomethyl-cyclopentane, 3(4)-isocyanatomethyl-1-methylcyclohexyl isocyanate (IMCI), toluene diisocyanate (TDI), methylene diphenyl diisocyanate (MDI), methylene dicyclohexane 4,4-diisocyanate, isophorone diisocyanate (IPDI), hexane diisocyanate (HDI) and the like.

Preferably, the isocyanate (i) is IPDI, TDT or IMCI.

The hydroxy-, amino- or acid functional compounds (ii) according to the present invention can have a polyether, polyester, polyamide, polyacrylate, polyolefin (hydrocarbon), polycarbonate, polyziloxane backbone, or the like, or mixtures thereof. For simplicity, hydroxy-functional compounds or polyols will be further described in detail, but the same can be applied to the amino- or acid-functional compounds. Moreover, whenever the term "diol" is used, this is also applicable to polyols. A polyether polyol is a polyol possessing a polyoxyalkylene structure composed of a polyoxyalkylene group having 2–10 carbon atoms and an oxygen atom as a repetitive unit and is preferably a diol.

Given as examples of diols possessing the above polyoxyalkylene structure are polyglycol compounds such as polyethylene glycol, polypropylene glycol, polytetramethylene glycol, polyheptamethylene glycol, polyhexamethylene glycol, polydecamethylene glycol, and the like; and polyether diols obtained by ring-opening copolymerization of two or more ionic polymerizable cyclic compounds, or mixtures thereof Examples of ion-polymerizable cyclic compounds include cyclic ethers such as ethylene oxide, propylene oxide, butene-1-oxide, isobutene oxide, 3,3-bischloromethyl oxetane, tetrahydrofuran, 2-methyl tetrahydrofuran, 3-methyl tetrahydrofuran, dioxane, trioxane, tetraoxane, cyclohexene oxide, styrene oxide, epichlorohydrin, glycidyl methacrylate, glycidyl acrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidyl benzoate, or mixtures thereof.

Also, polyether diols produced by ring-opening copolymerization of the above ion-polymerizable cyclic compound and a cyclic imine such as ethylene imine or the like, a cyclic lactone such as p-propiolactone or glycolic acid lactide or the like, or cyclic siloxanes such as dimethylcyclopolysiloxane or the like can be used, and mixtures thereof.

Examples of the specific combinations of two or more ion-polymerizable cyclic compounds include combinations of tetrahydrofuran and propylene oxide, tetrahydrofuran and 2-methyl tetrahydrofuran, tetrahydrofuran and 3-methyl tetrahydrofuran, tetrahydrofuran and ethylene oxide, propylene oxide and ethylene oxide, and butylene oxide and ethylene oxide. Two or more ion-polymerizable cyclic compounds may be combined at random in the resulting ring-opening polymer.

The aforementioned diols having a polyoxyalkylene structure are commercially available under the trademarks, for example, PTMG1000, PTMG2000 (manufactured by Mitsubishi Chemical Corp.), PPG100, PPG2000, EXCENOL2020, EXCENOL1020 (manufactured by Asahi Oline Co., Ltd.), PEGO000, Unisafe DC1100, Unisafe DC100 (manufactured by Nippon Oil and Fats Co., Ltd.), PPTG2000, PPTG1000, PTG400, PTGL 2000 (manufactured by Hodogaya Chemical Co., Ltd.), and the like.

In the foregoing production, a diol having no polyoxyalkylene structure and/or a diamine may be used either individually or in combination with the polyether polyol. Here, as examples of a diol having no polyoxyalkylene structure, a polyester diol (including for example polycaprolactone diol), polyolefine diol, polyamide diol, polyacrylate diol, polycarbonate diol, polysiloxane diol, and the like are given. Also mixtures of said diols can be used. Examples of a polyester diol include polyester diols obtained by reacting a polyhydric alcohol such as ethylene glycol, propylene glycol, tetramethylene glycol, 1,6-hexane diol, neopentyl glycol, or 1,4-cyclohexanedimethanol with a polybasic acid such as phthalic acid, isophthalic acid, terephthalic acid, maleic acid, fumaric acid, adipic acid, sebacic acid, or the like. Examples of a polycaprolactone diol include polycaprolactone diols obtained by reacting ε-caprolactone with a diol such as ethylene glycol, is tetramethylene glycol, 1,6-hexane diol, neopentyl glycol, 1,4-butane diol, mixtures thereof or the like. As examples of the polycarbonate diol, a polycarbonate diol of polytetrahydrofuran, polycarbonate of 1,6-hexane diol, and the like are given. These polycarbonate dials are commercially available under the trademarks DN-980, DN-981, DN-982, DN-983 (manufactured by Nippon Polyurethane Industry Co., Ltd.), PC-8000 (manufactured by PPG in US), and the like. Exemplary polyolefin diols include preferably linear or branched hydrocarbons containing a plurality of hydroxyl end groups. Examples of hydroxy functional polyolefines can also be aromatic, such as hydroxy functional polystyrenes or can be combined aromatic/aliphatic, such as hydroxy-functional styrene-polybutadiene-styrene block copolymers, and the like. Preferably, the hydrocarbon is a non-aromatic compound containing a majority of methylene groups ($-CH_2-$) and which can contain unsaturation. For example, copolymers of vinyl alcohol and vinyl acetate can be used. Fully saturated, for example, hydrogenated hydrocarbons are preferred because, for instance when used in coating applications, the long term stability of the cured coating increases as the degree of unsaturation decreases. Examples of hydrocarbon diols include, for example, hydroxyl-terminated, fully or partially hydrogenated 1,2-polybutadiene; 1,4- and 1,2-polybutadiene copolymers, 1,2-polybutadiene-ethylene or -propylene copolymers, polyisobutylene polyol; mixtures thereof, and the like. Preferably, the hydrocarbon diol is a substantially hydrogenated or fully hydrogenated 1,2-polybutadiene or 1,2-polybutadiene-ethene copolymer.

Examples of suitable amino functional compounds are Jeffamines, amino-terminated acrylonitrile butadiene copolymers, aliphatic polyamides, mixtures thereof and the like.

Examples of suitable acid functional polymers are saturated or unsaturated polyesters, acid-terminated acrylonitrile butadiene copolymers, aliphatic polyamides, mixtures thereof and the like.

In a particularly preferred embodiment of the present invention, the hydroxy functional compound (ii) is polytetrahydrofuran, polyethylene glycol, polypropylene glycol, ethylene oxide/butylene oxide copolymer, polyester, and mixtures thereof.

Preferably, the hydroxy-, amino- or acid-functional compound is a homo- or copolymer having a relatively low polarity.

The functional compound (ii) may also comprise combinations of two or all of the acid, hydroxy and/or amino functionalities, for example, combinations of acid/hydroxy, acid/amino, hydroxy/amino and hydroxy/amino/acid functionalities.

The homo- or copolymer backbone of the hydroxy-, amino- or acid-functional compound can be linear, branches, hyperbranched, dendritic, comb-like, or the like. The functionalities can be end-capped on the backbone, can be attached in the middle of the backbone chain, at random, or the like.

At least 40 wt. % (preferably, at least 60 wt. %, more preferably, at least 70 wt. %, particularly preferred at least go wt. %) of the hydroxy-, amino- or acid-functional compound (ii) has a molecular weight Mw of at least about 450 (further called the high Mw functional compound). Preferably, the high Mw functional compound is present in an amount of less than about 100 wt. %, more preferably, less than about 99 wt. %, particularly preferred, in an amount of less than about 98 wt. %. The Mw of the high Mw functional compound is preferably at least about 1,000, more preferably, at least about 1,500 and the Mw is about 20,000 or less, preferably, about 15,000 or less, more preferably, about 10,000 or less.

Thus, 60 wt. % or less (preferably, 40 wt. % or less, more preferred, 30 wt. % or less, particularly preferred 10 wt. % or less) of said functional compound can have a molecular weight of less than 450 (further called the low Mw functional compound). If more than 60 wt. % of the functional compound is having a Mw of lower than about 450 the resulting reaction product and supramolecular compound will be too brittle. If the low Mw functional compound is present, it is preferably present in an amount of at least about 0.05 wt. %, more preferably, at least 0.1 wt. %, particularly preferred, at least 0.2 wt. %. Preferably, the Mw of the low Mw functional compound is less than about 400, more preferably, less than about 300 and particularly preferred less than about 150 and is preferably at least about 50, more preferably, at least about 60, particularly preferred, at least about 70.

The low Mw hydroxy-, amino- or acid-functional compound can be mono- or multifunctional and mixtures of two or three functionalities can also be present. Optionally, if it is desired to control the Mw of the reaction product, a monofunctional low Mw functional compound can be used. Examples of said low Mw functional compound are found in the above lists, for instance, butanol or 1,6-hexane diol can be candidates for a low Mw hydroxy functional compound.

Mixtures of the high Mw to the low Mw functional compound can be in a ratio high Mw:low Mw of about (40–100 wt. %):(0–60 wt.), preferably, (60–99 wt. %):(1–40 wt. %), more preferably, (70–98 wt. %):(2–30 wt. %). In a particularly preferred embodiment of the present invention, the amount of high Mw functional compound is substantially higher compared to) the amount of low Mw compound. In particular, the low Mw compound is preferably present in an amount of less than about 3.0 wt. %, more preferably, less than about 2.0 wt. %. If a low Mw functional compound is used, it is preferably present in an amount of at least about 0.05 wt. %.

The compound according to the invention can be obtained by reacting, in a first step, the isocyanate (i) with the hydroxy, acid or amino functional compound (ii), for instance polytetrahydrofuran, for instance at room temperature, to form an isocyanate functional oligomer (A). Optionally, a catalyst can be present to enhance the reactivity and/or selectivity.

Subsequently, the oligomer (A) reacts with the nitrogen-containing compound (B), for instance, melamine to form a reaction product which forms a complex with a (or more) molecule(s) capable of forming hydrogen bonds. The resulting complex is called the supramolecular compound or composition.

The isocyanate functional oligomer (A) preferably has functionality n of 2–10, more preferably of 2–4 and a molecular weight of about 500–50,000, preferably about 500–20,000, more preferably about 550–10,000, and particularly preferred about 600–5,000. If the molecular weight is too high, the total amount of physical bonds is relatively small resulting in a less strong structure. If the molecular weight is too low, the product becomes brittle.

The nitrogen-containing compound (B) that is capable of reacting with said isocyanate functional compound (A) preferably comprises additionally to said nitrogen n amino-groups, in which n is at least 1. Preferably, n is less than 10, more preferably, lees than 8, most preferred, less than 5. Examples of suitable nitrogen-containing compounds are melamine, urea, acetoguanamine, benzoguanamine, cyanamide, dicyanamide, thiourea, isocytosine, aminopyridines, mixtures thereof, and the like.

Preferably, the nitrogen-containing compound is melamine, urea or a mixture of both, more preferred, melamine. Melamine shows a strong tendency for forming intermolecular interactions, resulting in the formation of strong reversible intermolecular physical interactions. Urea has a tendency to form relatively weak physical interactions, which can be advantageous to lower the viscosity and thus be better solvable.

Preferably, compound (B) comprises at least amino group. If (B) comprises more than 1 amino group, the molar ratio is preferably chosen as such that only one amino-group per compound (B) reacts with one isocyanate-group of (A) as represented by the following reaction equations (1) and (2):

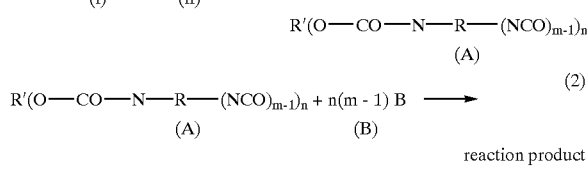

In a preferred embodiment of the invention, the molar ratio between the isocyanate-group of (A) and compound (B) ie about 0.8:1.2, more preferably about 1:1.

The reaction product of the present invention generally has a number average molecular weight Mn (averaged over the high and low Mw compounds) of at least about 700, preferably, at least about 750, more preferred, at least about 850, and particularly preferred, at least about 1,000 and a number average molecular weight of less than about 40,000, preferably, less than about 20,000, more preferably, less than about 15,000, and particularly preferred, less than about 10,000. The number average molecular weight (Mn) is determined by means of gel permeation chromatography (GPC) using a polystyrene standard.

The supramolecular compound of the present invention generally has a number average molecular weight of at least about 1,400, preferably, at least about 1,500, more preferably, at least about 1,700, and particularly preferred, at least about 2,000 and preferably, a number average molecular weight of less than about 100,000, more preferably, less than about 90,000, more preferably, less than about 80,000, particularly preferred, less than about 70,000.

Preferably, the elongation at break of the supramolecular compound according to the present invention at room temperature (25° C.) will be greater than about 2%, more preferably greater than about 5%, and particularly preferred, more than about 10%. If the elongation at break is lower than 2%, the compound will be too brittle. The elongation at break at 25° C. preferably will be lower than about 2,000%, preferably lower than about 1,500%, more preferred lower than about 1,000%.

The "supramolecular" compound comprising the reaction products according to the present invention can comprise identical and/or different reaction products. Identical reaction products are derived from the same components (A) and (B) and are prepared according to the same process. Different reaction products can be defined as derived from different compounds (A) and/or (B) (e.g. in chemical nature, Mw or the like) and/or as prepared according to different processes. As an example different reaction products can also include reaction products derived from a compound (A) having a copolymer backbone and/or reaction products derived from a compound (A) having a homopolymer backbone.

The supramolecular compound comprising the reaction products according to the present invention is fluid or (highly) viscous at a temperature above a certain transition temperature, as being defined above. Generally, the transition temperature lies in the range of about 5° C. to about 100° C. Preferably, the transition temperature lies between about 10° C. and about 80° C., more preferably, between about 15° C. and about 60° C., particularly preferred, between about 20° C. and about 50° C., and most preferred, between about 23° C. and about 45° C. Below said transition temperature, the supramolecular compound of the invention will be hardened because of the formation of a substantial amount of intermolecular physical interactions, such as hydrogen bonds, between the reaction products.

The reactions can be carried out in the presence of a solvent and also in bulk.

The compound according to the invention can be applied in various technical areas, examples being coatings, inks, toner resins, lacquers, adhesives, glues, castings and as thickener for resins such as, for instance, unsaturated polyesters. The compound of the invention can be applied on different substrates such as, for example, glass, paper, wood, plastic, brick, and metals such as aluminum and iron. Possible interesting applications can be, for example, in powder coatings, optical fiber coatings, for recordable media, such as lacquers for compact discs (CD and CD-R) and adhesives for digital versatile discs (DVD), or in rapid prototyping applications.

It can be particularly useful to apply the compound according to the present invention in coatings for optical fibers.

In the art, coatings for optical fibers generally consist of thermosetting materials, which are hardened by cross-linking on being heated or under the effect of ultraviolet radiation (UV-curable compositions). Said UV-curable compositions generally comprise an oligomer system, reactive diluent(s), expensive photoinitiator compounds, and other additives. For applying such UV-curable coating compositions, the fiber or set of fibers is caused to run through a coating die containing the resin in the non-crosslinked state (the still-liquid state), and then to run through an apparatus suitable for supplying thereto the energy which is required for causing cross-linking to take place. Such apparatus must include ultraviolet lamps associated with matching reflectors for focussing the radiation on the fiber or set of fibers. Such apparatus is complex, requires continuous maintenance and is thus relatively expensive.

Optical fibers are generally coated with two superposed covering layers, a relatively soft inner primary and a relatively hard outer primary coating. The inner and outer primary coatings can be colored or not. When a non-colored inner and outer primary coating are applied to the optical glass fiber, an ink or colored coating composition can be subsequently applied thereon. Further, a plurality of coated and optionally inked optical fibers disposed side by side and parallel to one another can be embedded in a common matrix material to form an optical fiber ribbon.

The compound or mixture of compounds according to the present invention can be used as an inner primary coating, an outer primary coating, a self-stratifying coating being defined as a coating showing a combination of inner and outer primary coating properties, an ink, matrix or bundling material. Any of the coloring (identification) layers or protective layers can be made of the reversibly physical bonded material of the present invention. The colored layer can be constituted by a reversibly physical bonded material to which a coloring agent, such as a pigment or dye has been added.

In practice, the compound (or mixture of compounds) of the invention, optionally in the presence of one or more solvents, can be applied as a liquid to the bare optical fiber, to the coated and optionally inked optical fiber or to the plurality of coated and optionally inked optical fibers at a temperature above the transition temperature and can subsequently be hardened by cooling to a temperature below the transition temperature. The transition temperature being as defined above.

The cooling can, for example, be performed by means of a conventional cooling system, or by leaving the treated body at ambient temperature, or by causing it to run through a bath of water or another cooling liquid or gas.

The coating, ink or matrix comprising the compound or mixture of compounds according to the present invention should not delaminate (and preferably show polymeric mechanical properties) at the temperatures of use. The temperatures of use can be defined as those temperatures at which the cured coating or the coated optical fiber is used. The temperatures of use preferably range from about −100° C. to about 100° C., more preferably from about −50° C. to about 80° C., particularly preferred from about −40° C. to about 70° C., most preferred from about −25° C. to about 60° C. In particular at room temperature the coating is in the hardened state.

The person skilled in the art of optical fiber coatings can control the composition of the compound or mixture of compounds according to the present invention depending on the properties he is looking for and is willing to achieve. For instance, by changing the length of the chain of the hydroxy functional, acid functional or amino functional compound (which preferably are at least difunctional) and/or by changing the molecular weight of the compound, soft or hard portions can be introduced depending on which type of coating is required.

The invention will be elucidated with reference to the following non-limiting examples.

EXAMPLE I

I.a. Synthesis of a Supramolecular Complex 70.0 g polytetrahydrofuran (molecular weight 1000) was dissolved in 70 ml dimethylsulfoxide (DMSO). A solution of 31.1 g isophorone diisocyanate in 100 ml DMSO was added. Six drops of dibutyltindilaurate were added dropwise to this solution. The reaction mixture was stirred for 6 hours at room temperature, following which 17.7 g melamine was dosed to the resulting reaction mixture. The temperature was raised to 150° C. and stirring took place overnight at that temperature. The DMSO was removed by distillation and the resulting product was dried at 120° C. until the weight was constant.

A film was pressed of this product and its mechanical properties were determined in a stress-strain cure (Dynamic Mechanical Analysis; ISO 5272). The elongation at break of the film was >500%.

EXAMPLES I–IV

In an analogeous way to example I, further compositions were made in which 1,6-hexane diol (HD) was used as part of component (ii). Testing was performed in the same way as well. Results are shown in Table 1.

TABLE 1

| Ex. | HD in PTHF wt. % (mole %) | E-modulus (MPa) | Yield stress (MPa) | Elongation at break (%) (25° C.) |
|---|---|---|---|---|
| I.b. | 0 | — | 0.15 | 800 |
| II | 0.25 (2%) | 455 | 1.90 | 140 |
| III | 0.60 (5%) | 1180 | 3.20 | 65 |
| IV | 1.20 (10%) | 1650 | 4.20 | 47 |

Examples I–IV show that the addition of increasing amounts of a low Mw hydroxy functional compound 1,6-hexanediol (HD) to the high Mw hydroxy functional compound polytetrahydrofuran (PTHF) results in an increasing modulus and strength and in a is decreasing elongation at break. In the absence of a low Mw compound (see Example I.b.), a very high elongation at break is achieved. Moreover, these examples show that a skilled person can fine-tune the coating properties by mixing different ratios of low Mw with high Mw hydroxy-, acid- or amino-functional compounds.

What is claimed is:
1. Reaction product obtained by reacting
   (A) an isocyanate functional compound which is the reaction product between
      (i) an isocyanate, and
      (ii) a compound containing at least one functional group selected from the group consisting of hydroxy, acid, and amino functional groups, at least 40% by weight of said compound (ii) having a weight average molecular weight of at least about 450, and
   (B) a nitrogen-containing compound that reacts with said isocyanate functional compound (A),
   wherein, said reaction product has a number average molecular weight less than about 20,000 and,
   wherein said reaction product comprises groups which form reversible intermolecular physical interactions comprising at least hydrogen bonding with other of said reaction product from the same or different isocyanate functional compound (A) and nitrogen-containing compound (B), such that the compound resulting from such reversible physical attractions exhibits a tensile strength of at least about 0.05 mPa at a temperature below a transition temperature and has an elongation at break at 25° C. of at least about 2%.
2. Reaction product according to claim 1, wherein the molar ratio between the isocyanate groups of compound (A) to the nitrogen-containing compound (B) is about 1:1.
3. Reaction product according to claim 1, wherein (B) is melamine, urea, acetoguanamine, benzoguanamine, cyanamide, dicyanamide, thiourea, aminopyridine, isocytosine or mixture thereof.
4. Reaction product according to claim 1, wherein (B) is urea or melamine or mixture thereof.
5. Reaction product obtained by reacting
   (A) an isocyanate functional compound which is the reaction product between
      (i) an isocyanate, and
      (ii) a compound containing at least one functional group selected from the group consisting of hydroxy, acid, and amino functional groups, at least 40% by weight of said compound (ii) having a weight average molecular weight of at least about 450, and
   (B) a nitrogen-containing compound that reacts with said isocyanate functional compound (A), wherein the nitrogen-containing compound (B) further comprises at least one amino group,
   wherein the molar ratio between the isocyanate groups of compound (A) to the nitrogen-containing compound (B) is about 1:1,
   wherein said reaction product comprises groups which form reversible intermolecular physical attractions comprising at least hydrogen bonding with other of said reaction product from the same or different isocyanate functional compound (A) and nitrogen-containing compound (B), such that the compound resulting from such reversible physical interactions exhibits a tensile strength of at least about 0.05 mPa at a temperature below a transition temperature and has an elongation at break, at 25° C., of at least about 2%.

6. Reaction product according to claim 1 or claim 5, having a number average molecular weight up to about 15,000.

7. Reaction product according to claim 1 or 5, wherein isocyanate (i) is 3 or 4-isocyanatomethyl-1-methylcyclohexyl isocyanate, toluene diisocyanate, methylene diphenyl diisocyanate, methylene dicyclohexane 4,4-diisocyanate, or isophorone diisocyanate.

8. Reaction product according to claim 1 or 5, wherein compound (ii) is at least one hydroxy-functional compound selected from polytetrahydrofuran, polyethylene glycol, polypropylene glycol, ethylene oxide/butylene oxide copolymer, polyester, or mixture thereof.

9. Reaction product according to claim 1 or 5, wherein from about 0.05 to about 40 wt % of the compound (ii) is low molecular weight compound having a weight average molecular weight not higher than about 450.

10. Reaction product according to claim 9, wherein said low molecular weight compound comprises monofunctional compound.

11. Reaction product according to claim 9, wherein the low molecular weight compound is present in an amount of from about 0.05 to about 2 wt. %, based on the total of functional compound (ii).

12. Reaction product according to claim 1 or 5, wherein the nitrogen-containing compound (B) is melamine.

13. Supramolecular compound comprising two or more reaction products according to claim 1 or claim 5, linked to each other by reversible intermolecular physical interactions comprising at least hydrogen bonding.

14. Supramolecular compound according to claim 13, having an elongation at break, at 25° C., of at least about 10%.

15. Supramolecular compound according to claim 13, having a number average molecular weight of from about 1,400 to about 100,000.

16. Supramolecular compound according to claim 13, having a number average molecular weight of from about 2,000 to about 70,000.

17. Supramolecular compound according to claim 13, which is a fluid or viscous material at a temperature above a transition temperature in the range of from about 15° C. to about 60° C., and is a solid at a temperature of below said transition temperature.

18. Supramolecular compound according to claim 13, wherein said reaction products are linked to each other via hydrogen bonds.

19. A composition comprising the supramolecular compound according to claim 13 and a coloring agent.

20. An ink composition comprising at least one supramolecular compound according to claim 13 and a coloring agent.

21. A cured coating comprising the supramolecular compound according to claim 13.

22. A coated optical fiber comprising an optical fiber coated with the cured coating composition of claim 21.

23. A process for forming a supramolecular compound having an elongation at break, at 25° C., of at least 2%, comprising, reacting
(A) an isocyanate functional compound which is the reaction product between
(i) an isocyanate, and
(ii) a compound containing at least one functional group selected from the group consisting of hydroxy, acid, and amino functional groups, at least 40% by weight of said compound (ii) having a weight average molecular weight of at least about 450, and
(B) a nitrogen-containing compound that reacts with said isocyanate functional compound (A), to form a reaction product;
wherein, said reaction product has a number average molecular weight less than about 20,000 and, wherein said reaction product comprises groups which form reversible intermolecular physical interactions comprising at least hydrogen bonds, with other of said reaction product from the same or different isocyanate functional compound (A) and nitrogen-containing compound (B),
and forming a complex between said reaction product and at least one molecule capable of forming hydrogen bonds, such that the resulting complex forms reversible physical attractions and exhibits a tensile strength of at least about 0.05 mPa at a temperature below a transition temperature, and has an elongation at break, at 25° C., of at least 2 percent.

24. The process according to claim 23, wherein the molar ratio between the isocyanate groups of compound (A) to the nitrogen-containing compound (B) is about 1:1.

25. The process according to claim 23, wherein said at least one molecule capable of forming hydrogen bonds comprises said reaction product.

26. The process according to claim 25, wherein said at least one molecule capable of forming hydrogen bonds comprises a second reaction product between an isocyanate functional compound (A) and a nitrogen-containing compound (B), wherein said second reaction product has at least one property different than the said reaction product.

* * * * *